Feb. 13, 1951 L. ESPENSCHIED 2,541,348

TIME DIVISION MULTIPLEX TELEPHONE SYSTEM

Filed July 24, 1948 3 Sheets-Sheet 1

INVENTOR
L. ESPENSCHIED
BY William F. Simpson.
ATTORNEY

INVENTOR
L. ESPENSCHIED
BY William F. Simpson.
ATTORNEY

Feb. 13, 1951 L. ESPENSCHIED 2,541,348

TIME DIVISION MULTIPLEX TELEPHONE SYSTEM

Filed July 24, 1948 3 Sheets-Sheet 3

INVENTOR
L. ESPENSCHIED
BY William F. Simpson,
ATTORNEY

Patented Feb. 13, 1951 2,541,348

UNITED STATES PATENT OFFICE 2,541,348

TIME DIVISION MULTIPLEX TELEPHONE SYSTEM

Lloyd Espenschied, Kew Gardens, N. Y., assignor to Bell Telephone Laboratories, Incorporated, New York, N. Y., a corporation of New York Application July 24, 1948, Serial No. 40,531

10 Claims. (Cl. 179—15)

This invention relates to communication systems and more particularly to time division multichannel transmission systems and to the selection of individual communication channels of such systems.

The object of the invention is to employ a single physical structure for the establishment of a plurality of substantially simultaneously existing communication channels. The basic plan provided by the present invention resides in the alternate and sequential use of a transmission line in common by a large number of pairs of subscribers, each pair using the common line at different time intervals, such intervals during which any one pair of subscribers have exclusive use thereof being extremely short but recurring periodically and at a high rate. The transmission channel thus established between any two subscribers is in the form of a discontinuously but periodically closed circuit. It is known that such a circuit is a satisfactory transmission medium even for voice currents.

In accordance with the present invention each of a plurality of substations having common access to the main transmission path has the equivalent of a rotary distributor associated with such path and held in synchronism with all other such devices by current transmitted over the said path. Each such station has a means for effectively connecting its network to any particular outlet or individual channel of said path accessible to said device so that such station may be effectively connected to such channel on a time division basis and thus establish communication to any other station which is effectively connected during the same time interval.

To explain this arrangement on a sort of slow motion basis it may be imagined that a complete cycle of use of the multiplex path may extend over an hour and that there are sixty substations each of which is normally connected to such path by his substation apparatus for one of the sixty different minutes. Thus substation No. 1 will be connected to the multiplex path during the first minute. Now if subscriber No. 5 wishes to communicate with subscriber No. 1, he will adjust his substation instrument so that he also will be connected to the multiplex path during the first (rather than his normally allotted fifth) minute. If then his instrument is so designed that closure of the circuit during the first minute of each hour will provide a usable communication channel, the picture will be complete except that instead of requiring an hour for each complete multiplex cycle it requires approximately one ten-thousandth of a second or less.

In United States Patent 2,379,221 granted to Espenschied on June 26, 1945, a time division multiplex path is employed locally within a telephone switching office. In accordance with the present invention, a time division multiplex signalling path is extended to a plurality of geographically separated stations such as subscriber's stations.

The system of the present invention will accommodate a plurality of subscribers, each normally allotted the exclusive use of the channel for a correspondingly small time division and connection between any two subscribers is effected by one of the subscribers adjusting his facilities so that his line is effectively connected to the common transmission channel for the particular time division assigned to the called subscriber. In order accurately to control the time intervals, a control current of high frequency is normally connected to the common channel and serves as a synchronizing means.

Each substation will be provided with selecting means operated by the subscriber and controlled by the commonly applied control frequency, which may be a ten thousand cycle current, for example, for selectively connecting such substation to the common transmission line during a particular one of the time divisions of each cycle of said synchronizing current.

The selecting means provided at each substation may take any one of several forms. By way of example, a pulse generator may be used so that by shifting the phase of the commonly supplied high frequency current a train of pulses may be provided to occur at any selected time division and utilized to close a circuit to the common channel.

A feature of the invention is a communication system and methods of operating in which a plurality of subscribers use a single transmission path in common for a plurality of non-interfering connections.

Another feature is a time division multiplex communication system in which a common communication channel is sequentially and periodically given over to the exclusive use of the various subscribers to the system.

Another feature of the invention is a common communication channel having connected thereto and carrying, in addition to the communication signals, current from a high frequency source useful, at each substation connected to such channel, for controlling the precisely timed periods during which such connections are effective.

The feature of this invention relates to a time division multiplex telephone system having a plurality of branch or way stations.

Another feature of this invention relates to a time division multiplex system wherein the main multiplex transmission system path extends to a plurality of stations each of which has means for selecting for use thereat any one of a plurality of the time division multiplex channels of the main multiplex path.

Another feature of this invention relates to a time division multiplex transmission system extending to a plurality of branch and way stations wherein the time of transmission or propagation of the signals between all branch points and between all stations and between all branch points and all stations is substantially equal to an integral multiple including zero of the complete multiplex cycle or frame interval.

Another feature of this invention relates to the method of transmitting the synchronizing currents over the same channels as the multiplex signaling currents without interference between the various multiplex channels and the synchronizing currents.

Another feature of this invention relates to multiplex channel selecting equipment which enables any one channel to be selected without the use of complicated equipment required to separate all the channels as is frequently the case at the terminals of such a system.

Another feature of this invention relates to multiplex equipment employing conventional high vacuum electronic tubes.

Another feature of the invention relates to terminal stations employing electronic vacuum tubes of the type disclosed in United States Patent 2,402,188 granted to A. M. Skellett, June 18, 1946, the disclosure of which patent is hereby made a part of this application by reference to the same extent as if it were fully set forth herein.

Another feature of the invention relates to time division multiplex channels selecting equipment employing phase shifting apparatus of the type set forth in United States Patent 2,004,613 granted to L. A. Meacham, June 11, 1935. The disclosure of the patent is hereby made a part of this application by reference to the same extent as if it were set forth in full herein.

The foregoing as well as other objects and features of this invention can be more readily understood in the following description when read with reference to the attached drawings in which:

Fig. 1 shows in diagrammatic form representative elements of the equipment at one station of a complex time division multiplex system;

Fig. 6 shows the manner in which Figs. 1 to 4 are positioned adjacent one another to illustrate the exemplary system embodying the present invention.

Figures 1, 6:
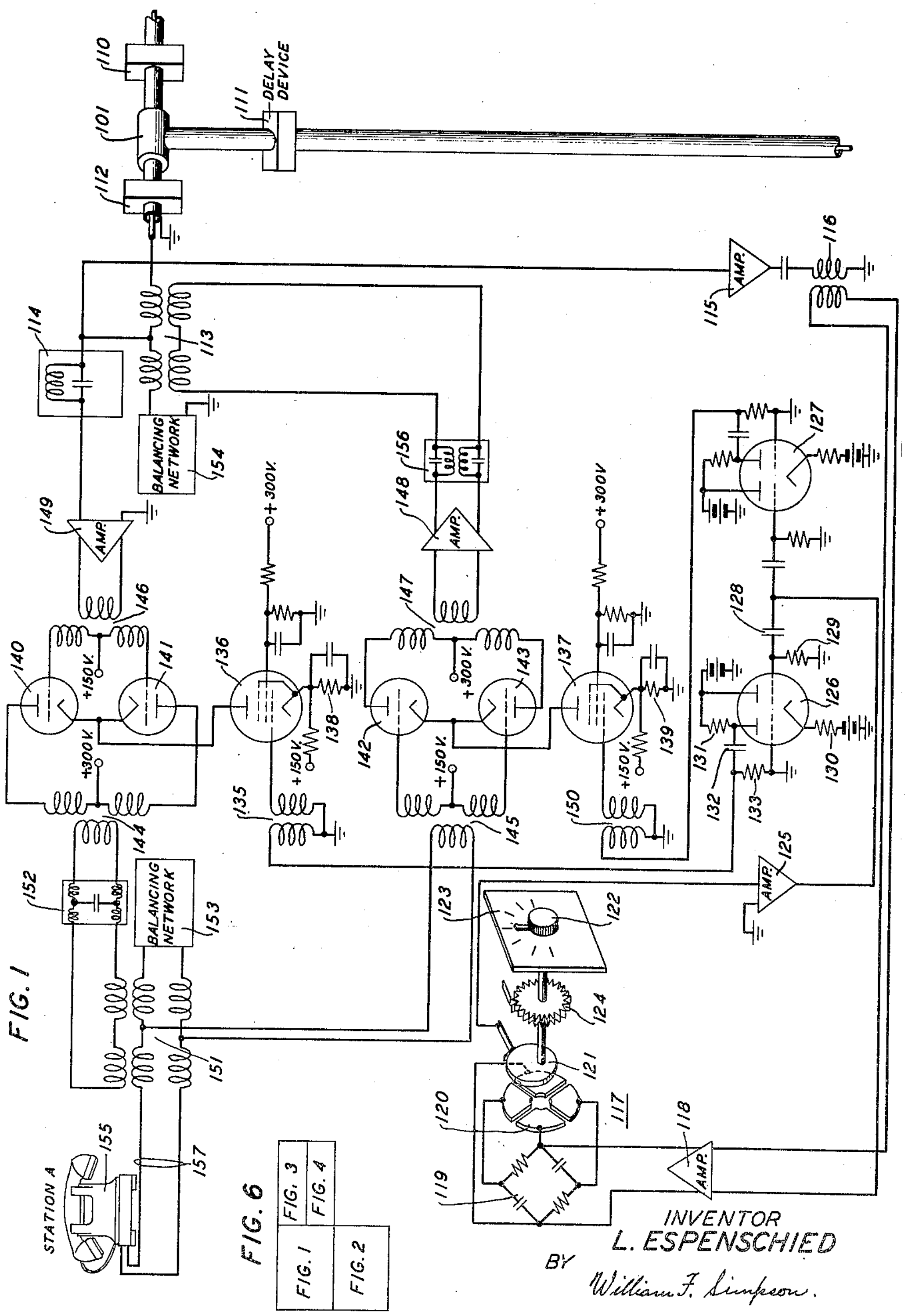

Multiplex channels as shown in Figs. 1 through 4 when arranged as shown in Fig. 6 extend to each of the representative stations connected to the system. While only four stations are actually shown in the drawing, it is understood that the channel may extend to any suitable number of stations. All of the stations connected to the multiplex path may be of the type shown in Figs. 1 and 2; all of the stations may be of the type shown in Figs. 3 and 4; or some of the stations may be of one type and other stations of the other type. It is also to be understood that stations of any other suitable type capable of selecting and transmitting multiplex signals of the type employed by the other stations of the system may also be connected to the multiplex path in a similar manner.

The multiplex channel is illustrated in the drawing of the exemplary system by a coaxial cable or conductor of suitable dimensions to transmit the necessary frequency range. This multiplex communication channel however, is not limited to such a transmission medium or path but may include other structures including other types of cables, wave guides, radio channels including the ultra-high frequency paths the waves of which possess numerous properties of light waves and sometimes called quasioptical paths.

Figures 3, 4, 5:
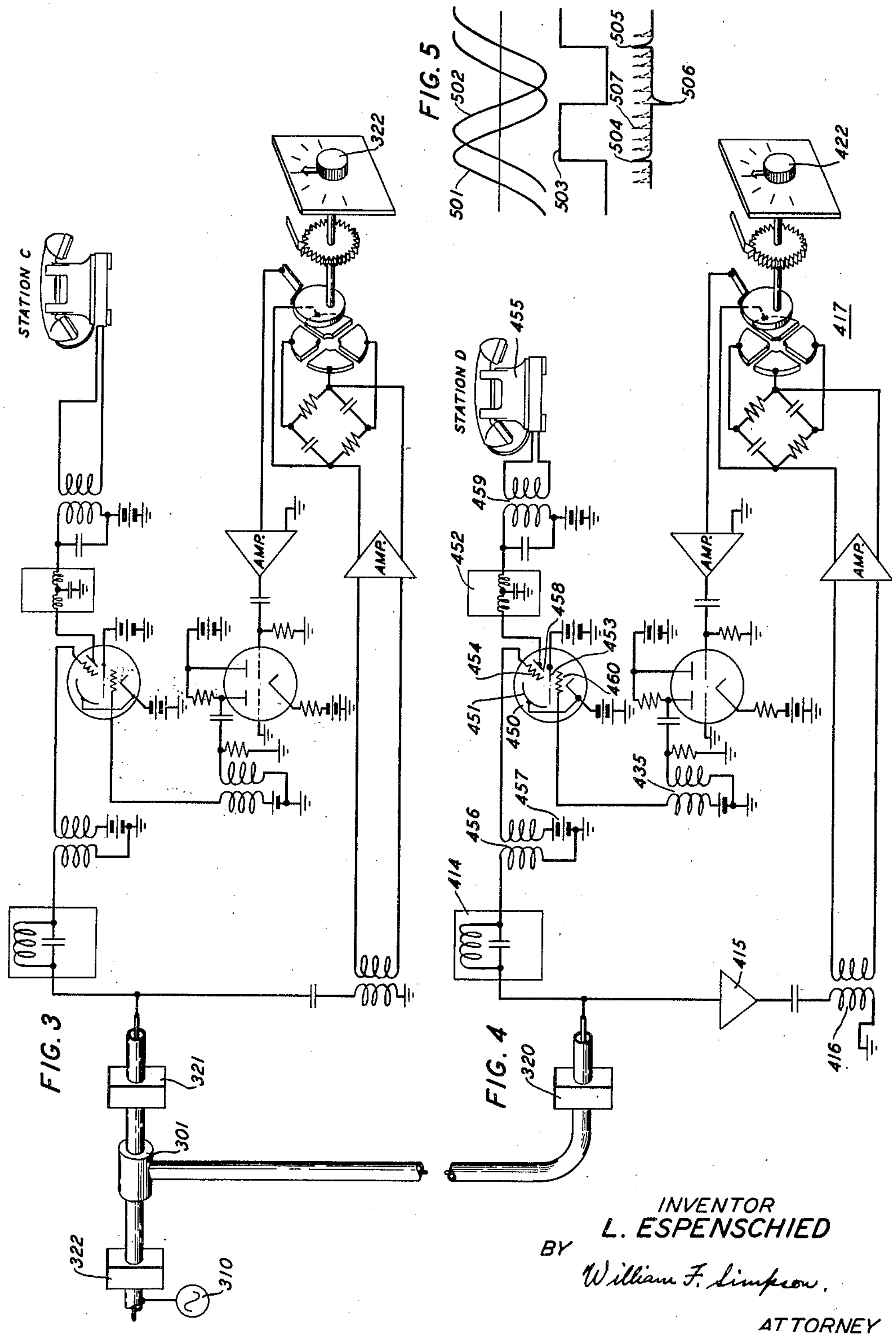
Figs. 3 and 4 show two other stations of the exemplary multiplex system employing tubes of the type set forth in the above identified Skellett patent.
Fig. 5 shows a graph of the synchronizing current and representative control pulses for individual channels.

As shown in Figs. 1 and 3, two representative branch points, 101 and 301, are shown in the main multiplex transmission path. These branch points may be of any suitable type including the type disclosed in Patent 2,064,907 granted to E. I. Green on December 22, 1936, and in particular Fig. 21 thereof wherein reflections at said branch points are minimized. While only two of such branch points or junction points have been shown in the multiplex transmission path it is to be understood that any suitable number will be provided in order to extend the path to a desired number of stations.

In order properly to synchronize the control equipment at the various subscriber stations so that the subscribers will be able to select the desired individual channel of the multiplex system, it is desirable to have control equipment at each subscriber station in exact synchronism with the control equipment of all the other subscriber stations.

In order to insure proper synchronizing, a source of alternating current 310 is shown connected to the multiplex channel, Fig. 3. The manner of the connection of this source to the channel is not shown but will be similar to the branch or junction points such as 101 and 301 described above.

The source of current 310 may be of any suitable type but usually will be a frequency stabilized oscillator such as a piezo-electric oscillator having a small or zero temperature coefficient and having various other types of amplitude and other stabilizing features including temperature stabilization, typical types of which are set forth in one or more of the following United States patents: 1,476,721 granted to Martin December 11, 1923; 1,660,389 granted to Matte on February 28, 1928; 1,684,455 granted to Nyquist on September 18, 1928; and 1,740,491 granted to Affel on December 24, 1929.

The disclosures of the foregoing patents are hereby made a part of the present application to the same extent as if they were fully set forth herein.

In order that a control equipment at the respective subscriber stations may be maintained in exact synchronization throughout the whole system it is necessary that the time of propagation of the waves between any pair of branches or junctions of the system, and between any junction and terminal point of the system and thus between any pair of the stations of the system be an integral multiple, including zero, of the time of the multiplex cycle, or frame period.

In order to insure that the propagation times between the various points of the system are integral multiples, including zero, of the multiplex cycle; a delay device has been shown in the main transmission path between each of the junctions and branches and extensions thereof. These delay devices are indicated by the rectangles 320, 321, 322, 110, 111, 112.

The delay devices connecting the transmission path may be of any suitable type including additional lengths of coaxial cable similar to the main multiplex transmission path or of any other suitable type. In case the transmission path employs wave guides, the delay devices may then be additional lengths of similar or other kind of wave guides. Other types of delay devices may also be employed. The sole requirement being that these devices have a suitably wide transmission band to transmit the frequency range of the multiplex signals with the desired overall delay, but without appreciable other distortion. Typical examples of suitable delay devices are described in the Institute of Radio Engineers, vol. 35, No. 12 for December 1947, pages 1580-1582 in an article entitled "Video delay lines" by J. P. Blewett and J. H. Rubel. Suitable types of delay devices or designs are also disclosed in the following United States Patents 2,245,364 granted to Riesz et al., June 10, 1941; 1,775,775 granted to Nyquist, September 16, 1930; and 2,263,902 granted to Percival on November 25, 1941.

With the delay devices all adjusted so that the propagation time between all of the stations, including the station at which the source 310 is connected to the system, are all integral multiples of the basic multiplex period which in an exemplary embodiment is .0001 second; the control current from source 310 will arrive at all of the subscribers' stations connected to the system in exactly the same phase. This control current in the exemplary embodiment set forth herein is a 10,000-cycle current.

At each of the stations connected to the multiplex system this 10,000-cycle current is separated from the main signal currents, which will be described hereinafter by means of filter networks.

For example at station A shown in Fig. 1, the incoming high frequency line is connected to a hybrid coil 113. From the hybrid coil the incoming signals are applied to the filter network 114 and isolating amplifier 115. The filter network 114 is a suppression type of filter designed to suppress the synchronizing frequency. The synchronizing frequency is suppressed by filter 114 so that this frequency will not interfere with an operation of the receiving equipment, and also so that receiving equipment will not interfere with the synchronizing frequency. Synchronizing frequency passes through the isolating amplifier 115 and through a resonant network or narrow band-pass filter 116, which filter permits only the synchronizing frequency to pass through it to the phase adjusting or controlling apparatus 117. If desired, an additional amplifier 118 will be provided between the filter elements 116 and phase control equipment. Such an amplifier may be used to control the level of the current applied to the phase control equipment and also to control the wave form of the synchronizing current applied to the phase shifting or controlling apparatus.

The phase shifting apparatus comprises bridge circuit 119 and a special condenser arrangement 120 comprising four stationary condenser elements or their equivalent and one or more rotary elements for cooperating with these stationary elements. The position of the rotary element 121 relative to the stationary condenser plates controls the phase of the voltage induced upon this element. Such a phase controlling or adjusting device is described in greater detail in the above-identified United States Patent 2,004,613 granted to Meacham. The movable element 121 is controlled by means of a knob or lever 122 which is provided with a scale 123. A star wheel 124, and associated spring, attached to the shaft carrying the movable element 121 and knob 122 are provided to hold the shaft and thus the knob and movable element 121, in any one of a plurality of fixed positions. Each one of these positions designates an individual channel of the time division multiplex system. The movable element 121 is connected to an amplifier 125. The amplifier 125 is employed to amplify the output from element 121 and to control its wave form. This amplifier will frequently operate as a limiting amplifier and increase the steepness of the wave in its output circuit.

Tubes 126 and 127 operate as limiting amplifiers and tend to cause square waves to be generated from the output of amplifier 125. The output current from amplifier 125 is applied to the control element of the right-hand section of tube 126 through the coupling network comprising condenser 128 and resistor 129. The elements of this coupling network have such values that their time constant is long compared to the time of one cycle of the synchronizing current.

The grids of both sections of this tube are biased to ground potential and since the cathodes are connected through a common cathode resistor 130 both sections will tend to pass about the same anode current except that the current through the left-hand section is reduced by the anode resistor 131. The magnitude of the incoming signals applied to the control grid of the right-hand section is such that when the signal goes negative to the right-hand section is cut off and when the signal goes positive the right-hand section tends to saturate.

When the right-hand section of tube 126 is cut off, the voltage drop across the common cathode resistor 130 tends to decrease with the result that less bias voltage is applied between the grid and cathode of the left-hand section of this tube. Current flow through this section tends to rise to the saturating value. When current through the right-hand section increases, the voltage drop across the common cathode resistor 130 also increases and applies a larger negative bias between the cathode and control element of the left-hand section of tube 126 with the result that current flowing through this section is cut off. In this manner tube 126 operates as a limiting amplifier and tends to cause the current flowing in the anode circuit of the left-hand section of tube 121 to have a square wave form.

The output of the left-hand section of tube 126 is coupled to an impulse coil 135 through coupling condenser 132. The time constant of the coupling condenser 132, together with resistors 131 and 133, is relatively short compared to the time of one cycle of the synchronizing current with the result that this network tends to differentiate the square wave with the result that pulses of very short duration are applied to the impulse coil 135. Impulse coil 135 repeats these pulses to the control grid of tube 136.

The above-described operation of the synchronizing and control equipment at the station shown in Fig. 1 and the control equipment at each of the other stations which operates in substantially the same manner, is illustrated in Fig. 5. The curve 501, Fig. 5, represents the synchronizing current as received over the transmission path. This current is then amplified and transmitted through filters and applied to the phase adjusting equipment 117. The output of the phase adjusting device is illustrated by curve 502. By adjusting the phase adjusting device, that is, by turning knob 122 the displacement between the two curves 501 and 502 may be changed at will by the subscriber. In other words, the curve 502 may be moved along the axis from coincidence with curve 501 to coincidence with this same curve a whole cycle later. The graph 503 illustrates the square wave form generated in the anode or output circuit of the left-hand section of tube 126 when the phase controlled current represented by 502 is applied to the control grid of the right-hand section of tube 126, after having been amplified by amplifier 125. The condenser 132 and the related resistances as described above, cause pulses 504, 505, and 506 to be applied to the pulse repeating coil 135. The negative pulses 506 will be suppressed due to the action of tube 136 whereas the positive pulses 504 and 505 are employed to control the transmission circuits at the station as will be described. As indicated by the dotted pulses 507 the pulses applied to the repeat coil or impulse transformer 135 may be positioned at a plurality of discreet places along the time axis within each cycle of the controlling frequency 501 by adjusting the knob 122. As pointed out above, the star wheel 124 and spring detent are employed to position the movable member 121 of the phase shifter in any of a plurality of discreet positions each of which gives rise to pulses in one of the discreet positions during each multiplex cycle as illustrated by the dotted pulses 507 in Fig. 5. The different positions of the pulses 507 and the different time intervals during which they occur comprise the different individual channel intervals during which the main multiplex path is extended to the various individual stations of the system.

Figure 2:
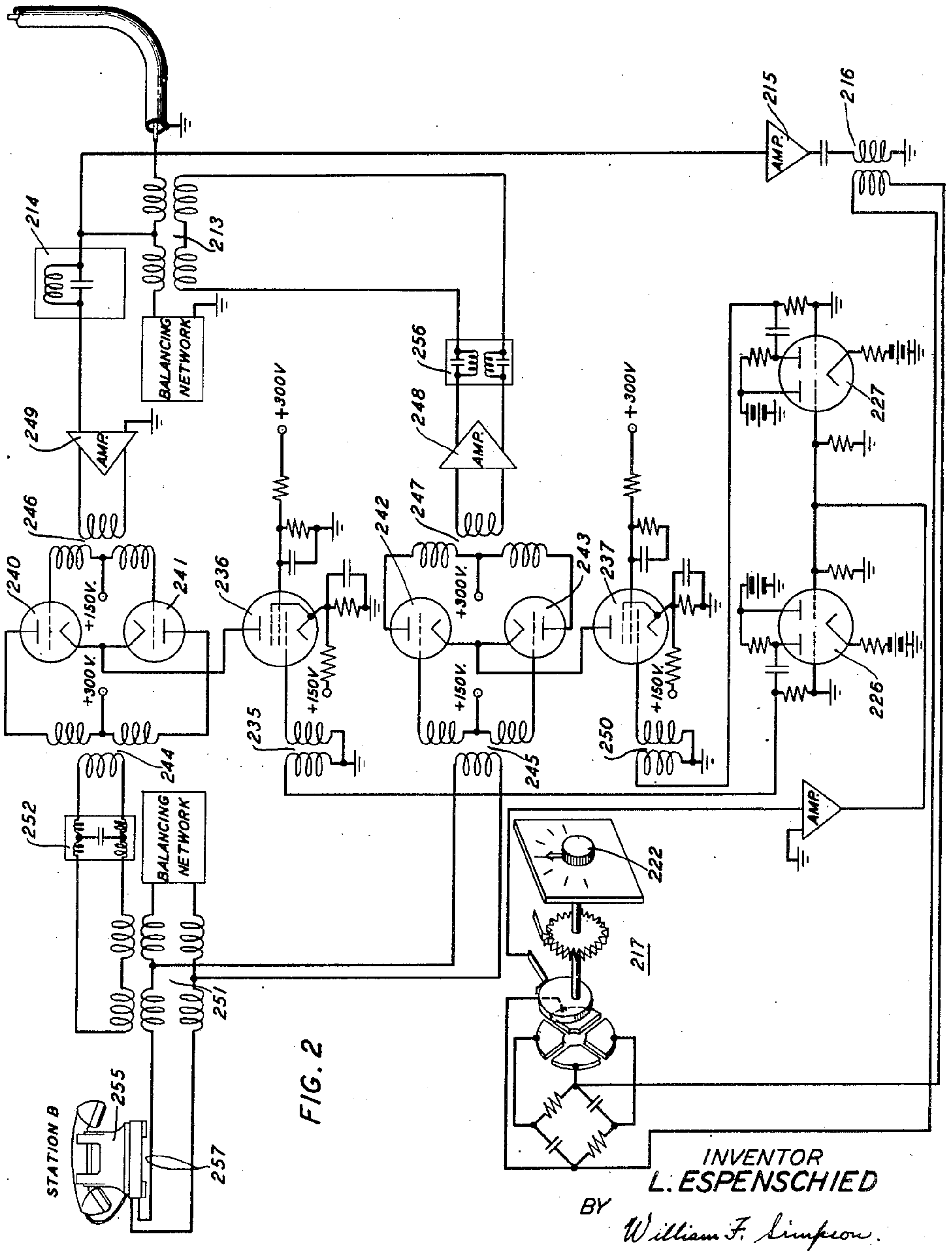
Fig. 2 shows a similar station which like station A shown in Fig. 1 employs conventional types of electronic tubes.

Similar synchronizing and control equipment is provided at the other stations shown in Figs. 2, 3 and 4. At each of these stations the synchronizing circuit operates in substantially the same manner and causes pulses similar to pulses 504 and 505 to be applied to the transmission equipment at each of these stations. The pulse positions such as illustrated by 504, 505 and 507 in Fig. 5 occur at substantially the identical instants of time at each and every one of the stations connected to the multiplex transmission path. Furthermore, the subscribers at each of these stations may move the selector knob 122 to any one of a plurality of positions and thus select for use any one of all or of a group of the multiplex channels.

Each of the stations of a multiplex system is assigned a specific channel on the multiplex system. If the subscriber does not wish to communicate over the system he will therefore turn the knob 122 to his channel so that his telephone equipment 155 will be associated with the channel assigned to his station. The other subscribers will likewise turn the phase shifting equipment to the channels assigned to their stations.

At the station shown in Fig. 1, for example, positive pulses will be applied to the control grids of tubes 136 and 137 from the control equipment in the manner described above through the respective pulse repeating coils or transformers 135 and 150. The tubes 136 and 137 are normally biased by means of cathode resistor and condenser networks 138 and 139 respectively, as well as by a voltage from a battery or voltage divider as shown so that no current flows through these tubes with the result that their anodes are a relatively high potential. It is noted that the anode of tube 136 is connected to the cathodes of tubes 140 and 141. It should also be noted that the grids of tubes 140 and 141 are connected to a positive voltage of 150 volts. However, with no current flowing through tube 136 its anode is at an appreciably higher voltage than 150 volts with the result that tubes 140 and 142 are also normally maintained non-conducting. Furthermore since no current flows through the anode circuit of tube 136 at this time, no current can flow in the anode circuits of tubes 140 and 141. Tubes 142 and 143 are likewise maintained non-conducting by tube 137 in a similar manner. However, upon the application of a positive pulse to the control grids of tubes 136 and 137 from the respective pulse transformer 135 and 150 the plate potential falls to a value near 150 volts. This potential can be regulated by the magnitude of the pulse applied to the control elements of tubes 136 and 137 as well as by potentials applied to other elements of this tube and other circuit parameters. These potentials are so chosen that during the time a positive pulse is applied to the control elements of tubes 136 and 137 from the synchronizing equipment as described above, the related tubes 140, 141, 142 and 143 act as normal amplifier tubes.

As a result the output from tubes 140 and 141 will be a pulse of short duration each time a synchronizing pulse is applied to the control grid of tube 136. The magnitude of the output pulse will be a function of the signal potential applied to the grids of tubes 140 and 141 through the input transformer 146 at the time of the synchronizing. In a similar manner the magnitude of the pulse from tubes 142 and 143 will be a function of the magnitude of the signal voltage applied to the input transformer 145. Tubes 140 and 141 are employed to repeat signals from the multiplex line to the subscriber's station 155 while tubes 142 and 143 are employed to repeat signals from the subscriber's station 155 to the multiplex transmission channel. A hybrid coil 151 is employed to separate the directions of transmission to and from the subscriber's line while the hybrid coil 113 is similarly employed for signals to and from the multiplex transmission path.

Assume now for purposes of illustration that the subscriber at station A of Fig. 1 wishes to communicate with the subscriber B at Fig. 2. Subscriber A will set his phase control equipment, such as the control knob 122, so that his synchronizing pulses are shifted to correspond to the time assigned to subscriber's station B, Fig. 2. Thereafter the synchronizing pulses from the synchronizing circuit will be applied to the control elements of tubes 136 and 137 at the same time synchronizing pulses are applied to corresponding tubes 236 and 237 of Fig. 2.

As shown in both Figs. 1 and 2, the subscribers' stations 155 and 255 are connected to the multiplex equipment over telephone lines 157 and 257. As shown in the drawing these lines are represented by two metallic conductors. It is to be understood, however, that any suitable type of line or communication path may be employed. The subscriber at station A of Fig. 1, after moving his station indicator 122 to the station desired, will first listen on the channel to determine whether or not the subscriber station B is busy. If the channel is busy the subscriber will hear the conversation and thereupon wait until it is idle. Upon the termination of said other conversation to station B or at any other time when the multiplex channel or the increment of time assigned to station B is idle the subscriber will cause any suitable calling signal to be transmitted over the multiplex line to station B to call a subscriber thereat.

Thereafter the subscribers may communicate one with another. Both the calling and talking currents from the subscriber's station 155 are transmitted over the voice frequency path of the subscriber's line 157. This line is terminated in a hybrid coil 151 and balancing network 153. This coil or network is designed to cause the signals incoming over line 157 to be repeated to the input transformer 145, Fig. 1. The incoming signals are not repeated in the circuit of the output of tubes 140 and 141.

Assume for purposes of illustration that the channel assigned to station B of Fig. 2 is idle. The subscriber upon listening and determining the channel as idle will call station B. The calling currents as received over line 157 and transmitted through the hybrid coil 151 are applied to the input transformer 145 and to the control grids of tubes 142 and 143. Thus each time a synchronizing pulse is applied to the cathodes of these tubes they will operate as amplifiers and cause a pulse of varying magnitude to be transmitted over the coaxial line. The magnitude of each of the pulses is a function of the magnitude of the voice current or voltage at the time of transmission of the pulse. The pulses are transmitted first through the output transformer 147, then through amplifier 148, filter network 156 and the hybrid coil 113 to the outgoing line. The filter network 156 is provided to eliminate the ten-thousand cycle component from outgoing pulses. In this manner the outgoing pulses are prevented from interfering with the synchronizing equipment.

In addition to the protection afforded by band-elimination filter 156, the output of amplifier 148 and filter 156 is connected to one set of terminals on the hybrid coil 113. The output signals are then transmitted over the multiplex line but do not contain the fundamental frequencies of the pulse system. As a result these signals will not in any way interfere with the operation of the synchronizing equipment. Thus each time a synchronizing pulse in the time assigned to channel B is applied to the control grids of tubes 140, 141, 142 and 143 current will flow in the output circuits of these tubes which current comprises a pulse of short duration having a magnitude which is the function of the magnitude of the signal currents applied to the input transformers associated with the respective tubes. This pulse is transmitted over the multiplex transmission system including the delay devices to the station shown in Fig. 2. These pulses arrive at station 2 at substantially the same instant of time in the multiplex cycle at which they left station 1 when the stations shown in Figs. 1 and 2 are relatively close together. When these stations are further apart the signals will arrive at station shown in Fig. 2 at substantially the same time within the multiplex interval but within a later multiplex interval.

The signals upon arrival at the station shown in Fig. 2 are transmitted first through the hybrid coil 213 and then through the filter 214 and amplifier 249 to the tubes 240 and 241 through the input transformer 246. The tubes 240 and 241 have synchronizing pulses applied to their cathodes in the same manner as described above with reference to tubes 140, 141, 142, and 143. The synchronizing pulses will be at the time assigned for the channel assigned to the station shown in Fig. 2 and thus will be substantially simultaneous with the arrival of the signals over the multiplex path. As a result the pulses received from the multiplex path are repeated by tubes 240 and 241 and transmitted through the output transformer 244 and low-pass filter 252 to the hybrid coils 251.

It should be noted that the synchronizing and signalling pulses may have a maximum duration equal to the time assigned to the channel. Either or both groups of these pulses may be shorter in duration if it is so desired, and generally a shorter duration is advantageous.

It should also be noted that only the pulses arriving at the time interval assigned to station B shown in Fig. 2, that is, only the pulses of the multiplex channel assigned to station B of Fig. 2, are repeated by the tubes 240 and 241. At all other times these tubes are blocked due to the high positive voltage of their cathodes which, with reference to the potential of the grids of these tubes, is equivalent to a high negative blocking grid potential. From the hybrid coil 251 the signals are transmitted over a line 257 to the subscriber's station 255. Signals are transmitted in the reverse direction in much the same manner as described from station 155. In this case the signals are transmitted from station 255 over the line 257, hybrid coil 251 and input transformer 245 associated with tubes 242 and 243.

It should be noted that due to the well-understood action of the hybrid coils the signals from tubes 240 and 241 through the output transformer 244 and low-pass filter 252 are not applied to the input transformer 245.

It should also be noted that the low-pass filter 252 may be of any suitable type that is designed to suppress all frequencies greater than about one half the fundamental repetition frequency of the multiplex channel. By using such a filter the high frequency components of the pulses are suppressed and at the same time the pulses of varying amplitude are employed to reconstruct the signalling or speech wave similar to that applied to the input transformer 145 of Fig. 1.

The signals applied to the input transformer 245 are transmitted through tubes 242 and 243 during the time interval the synchronizing pulses from tube 227 are applied through the transformer 259 to the control element of tube 237. These pulses will be applied during the time intervals assigned to station B and thus to the channel of a multiplex system assigned to station B. As a result pulses of varying amplitude are applied to the multiplex line during this channel or time interval. Pulses from tubes 242 and 243 are transmitted through the output transformer 247, amplifier 248, band-elimination filter 256 and through the hybrid coil 213 to the transmission channel. It should be noted that due to the well understood operation of hybrid coils such as 213 the signals output from tubes 242 and 243 are not applied to amplifier 249 through filter 214 nor are they applied to the synchronizing equipment through amplifier tube 215 and filter elements 216. In order to further insure isolation and independent action of synchronizing equipment filter 256 is inserted in the output of amplifier 248. This filter will further suppress the ten-thousands cycle component of the multiplex signalling pulses.

The signals are then transmitted from the hybrid coil 213 over the multiplex channel to the hybrid coil 113 where they are transmitted through filter 114 and amplifier 149 to the input coil 146. Due to the filter elements 116, which may assume any desired form, the multiplex signaling pulses are not transmitted to the synchronizing equipment and thus do not interfere with the operation of this equipment.

From amplifier 149 the signals are transmitted through the input transformer 146 to the control elements of tubes 140 and 141. The output of tubes 140 and 141 is connected to low-pass filter 152. Thus upon the application of signal currents to the control elements of tubes 140 and 141 and upon the application of a pulse from the impulse coil or transformer 135 a pulse is repeated to the filter 152 which in effect reconstructs the original signal wave. From filter 152 the signals are transmitted through the hybrid coils 151 and over line 157 to the subscriber's station 155.

Due to the operation of the hybrid coil 151 and the balancing network 153 the signals from tubes 140 and 141 are not transmitted to the input transformer 145.

Thus any subscriber may communicate with any other subscriber by adjusting his synchronizing equipment so that his station will be effectively connected to the channel or time interval assigned to the called station.

The stations shown in Figs. 3 and 4 operate in a similar manner except that the more conventional types of electronic tubes have been replaced by tubes of the type described in the above-identified patent to Skellett.

Assume for example, that the subscriber at station D, Fig. 4, wishes to communicate with the subscriber at station B shown in Fig. 2. The subscriber at the station shown in Fig. 4 will operate his channel selector by turning knob 422 which in turn sets the phase control apparatus 417 so that pulses are delivered to tube 450 from the synchronizing apparatus at the times assigned to station B shown in Fig. 2. As pointed out above, these pulses are applied to the transmission apparatus at station D shown in Fig. 4 at substantially the exact time in each multiplex cycle that similar pulses are applied to transmission apparatus at station B.

The subscriber at station D will then listen on the channel to determine whether or not it is busy, and if it is not busy, he will call a subscriber at station B in any suitable manner. When a subscriber at station B answers, the two subscribers may communicate with each other. The operation of the equipment at station B will be exactly as described above. At station D, shown in Fig. 4, when the subscriber talks voice currents are transmitted from his subset 455 and through the transformer or induction coil 459 to the anode or plate 458 of tube 450, through the low-pass filter 452.

Normally tube 450 is not repeating or amplifying the signals applied to its control elements because the source of primary electrons has been cut off and blocked, due to the potential applied to the cathode and the control grid 460, and screen 453. However, upon the application of a positive pulse from the impulse coil 435 of the synchronizing equipment, a beam of primary electrons flows through the aperture in screen 453, and impinges upon the multiplying element 451. When the electrons strike element 451 they cause secondary electrons to be omitted therefrom which electrons then flow past the control grid 454 to the plate or anode 458. Some of the electrons are collected by the control element 454. The number of electrons collected by the element 454 is a function of the potential of the plate or anode 458. Thus the potential of the anode 458 at the time the synchronizing pulse is applied to the primary control grid 460 is repeated to the control element 454 and thus through the transformer or repeat coil 456 to the coaxial line of the main multiplex path. These pulses are transmitted through the band elimination filter 414. As before, filter 414 suppresses the components of the pulse having a frequency of the synchronizing currents received from source 310. In this manner the operation of the transmitting equipment is prevented from interfering with the operation of the synchronizing element at station D shown in Fig. 4 or at any other station of the system.

The pulses transmitted over the multiplex channel arrive at station B shown in Fig. 2 at the proper time to be repeated through the transmission equipment and as described above. The timing of these pulses is controlled by the various delay networks in the main multiplex transmission path as described above so that they always arrive at each of the stations at the exact time. Synchronizing pulses designating the respective channels are generated at these stations, provided the station or channel selector is properly positioned to select the channel in question.

The synchronizing current received from station B, shown in Fig. 2, over the multiplex path is transmitted through amplifier 415 to the band pass filter 416. This filter merely selects the synchronizing frequency for controlling the synchronizing equipment at station D shown in Fig. 4. Inasmuch as the multiplex signals from station B, as assumed above, have passed through band elimination filter 256 which filter removes such frequency components from the signals, these signals will not in any way affect or interfere with the operation of the synchronizing equipment.

The remaining portions of the received signals from the multiplex path are transmitted through the narrow band elimination filter 414 to the repeat coil 456 and applied to the control element 454 of tube 450. Then upon the application of a synchronizing pulse which serves as a gating pulse, electrons flow from the cathode to the secondary emitting element 451, where they cause secondary electrons to be emitted and flow to the plate or anode 458. The number of electrons which flow to this element is controlled by the potential of the controlling screen or grid 454 so that a pulse having a magnitude controlled by the magnitude of the received pulse is transmitted through the low-pass filter 452 to the subscriber receiving equipment 455 through the coupling tranformer 459. The low-pass filter 452 removes the high frequency components from the pulses applied to it from the anode 453 of the tube 450 and in effect reconstructs a voice frequency wave similar to the wave generated by the subscriber station equipment 255 in station B.

It is to be noted that the pulses from tubes 242 and 243 during the time station B is transmitting may be of either positive or negative polarity. However, when these pulses are transmitted through amplifier 248, sufficient bias may be added to them to render them unidirectional for transmission over the multiplex path and also for proper control of the receiving equipment at station D. Similarly, the pulses received over the communication path at station B may be unidirectional. In this case amplifier 249 or the output circuit thereof may be arranged to remove the direct current component so that these pulses will properly operate the receiving tubes 240 and 241.

The subscriber station D of Fig. 4 may likewise communicate with the subscriber station C shown in Fig. 3. In this case, the equipment at the subscriber station shown in Fig. 3 operates in substantially the same manner as described above with reference to the apparatus at station 4.

It is thus apparent that any subscriber may communicate with any other subscriber and may adjust his station or channel selecting equipment so that his transmitting and receiving equipment will operate over any of the channels of the multiplex equipment for which this selecting equipment is designed to operate. It is of course apparent that the selecting apparatus may be arranged so that only certain of the multiplex channels may be selected by certain of the subscriber stations. It is also evident that when desired, a plurality of subscribers may all set their station selecting equipment on a common channel and thus in effect have a conference circuit established between them by means of which each of the subscribers connected thereto may communicate with all the other subscribers.

What is claimed is:

1. In a communication system, a plurality of substations, transmitting and receiving apparatus at each of said substations a common two-way communication channel for said substations, a source of synchronizing alternating current connected to said channel, and means at each of said substations responsive to said synchronizing current for selectively and effectively connecting both said transmitting and receiving apparatus at said substations to said channel during any single predetermined time interval during each cycle of said synchronizing current, and means at each of subscribers' stations to select any one of a plurality of said predetermined time intervals for connecting both said transmitting and receiving apparatus to said common channel.

2. In a communication system, a plurality of substations, telephone transmitting and receiving means at each of said stations, a common two-way communication channel for said substations, a source of control current connected to said channel, means at each of said substations responsive to said control current for effectively connecting said transmitting and receiving means at each of said substations to said channel during different time intervals preassigned to said respective substations during each cycle of said control current, and manually adjustable means in one or more of said subscriber stations for selectively changing the response of said first means to effectively connect transmitting and receiving means at said substation to said channel during a time interval normally allotted to a wanted substation to establish communication therewith.

3. A time division multiplex system comprising a common communication channel, terminal stations and way stations connected to said channel, delay means individual to each of a plurality of said stations included in the said channel for adjusting the propagation time between said stations over said channel to an integral multiple, including zero, of the complete multiplex interval.

4. A time division multiplex system comprising a common communication channel, terminal stations and way stations connected to said channel, delay means included in the said channel for adjusting the propagation time between each of said stations and all the other of said stations over said channel to an integral multiple, including zero, of the complete multiplex interval, a synchronizing equipment located at each of said stations, a source of synchronizing current connected to said channel for controlling said synchronizing equipment means whereby said synchronizing equipment generates a pulse at a plurality of said stations at substantially the same instant of time.

5. A multiplex transmission system comprising a multiplex communication channel, terminal stations and branch stations connected thereto, a source of synchronizing current connected to said channel, synchronizing equipment at each of said stations for generating a synchronizing pulse for each complete multiplex period, time delay equipment individual to each of a plurality of said stations connected in said channel for adjusting the phase of said synchronizing current as applied to said synchronizing equipment at each of said stations for causing the generation of said synchronizing pulses at a plurality of said stations at substantially the same instant of time.

6. A multiplex transmission system comprising a multiplex communication channel, terminal stations and branch stations connected thereto, a source of synchronizing current connected to said channel, synchronizing equipment at each of said stations for generating a synchronizing pulse for each complete multiplex period, time delay equipment connected in said channel for adjusting the phase of said synchronizing current as applied to said synchronizing equipment at each of said stations for causing the generation of said synchronizing pulses at each one of a plurality of said stations at substantially the same instant of time, means for selecting one of a plurality of times during each complete multiplex period for the generation of said synchronizing pulse.

7. In a multiplex system, a two-way multiplex transmission path, terminal and way stations connected to said path, a source of synchronizing current transmitted over said path, synchronizing equipment located at each of said subscriber stations maintained in synchronism by said synchronizing current for dividing the multiplex interval into a plurality of discrete time or channel intervals, transmission equipment located at each of said stations, and means for selecting the desired ones of said channel intervals, and means for transmitting signals from said transmission apparatus to and from said multiplex path during the selected instants of time.

8. In a multiplex system, a two-way multiplex transmission path, terminal and way stations connected to said path, a source of synchronizing current transmitted over said path, synchronizing equipment located at each of said subscriber stations maintained in synchronism by said synchronizing current for dividing the multiplex interval into a plurality of discrete time or channel intervals, transmission equipment located at each of said stations, and means for selecting the desired ones of said channel intervals, means for transmitting signals from said transmission apparatus to and from said multiplex path during the same selected instants of time, and means for permitting any number of said stations to select the same interval during each multiplex cycle for communication between all of the stations selecting said interval.

9. In a communication system a plurality of telephone stations, transmitting and receiving apparatus at each of said stations, a common two-way time division multiplex communication channel extending between said stations, a plurality of delay devices connected in said channel for adjusting the propagation time between each of said stations and all of the other of said stations to an integral multiple of a complete multiplex time interval, a source of control current connected to said channel, means at each of said stations responsive to said control current for effectively connecting said transmitting and receiving apparatus to said multiplex channel during a predetermined single time interval during each of said multiplex intervals and manually adjustable means at one of said stations for selectively changing the time interval during each cycle during which the transmitting and receiving apparatus at said stations are connected to said multiplex channel.

10. A time division multiplex system comprising a plurality of telephone stations, transmitting and receiving means at each of said stations, a branched time division multiplex communication path extending to all of said stations, delay means included in said path between each branch point and in each of said branches for adjusting the propagation time between each of said branch points and over each of said branches to an integral multiple of a multiplex interval, a source of control current connected to said path, means at each of said stations responsive to said control current for effectively connecting said both transmitting and receiving means at each of said stations to said channel during intervals of time during every complete multiplex cycle individually preassigned to said stations and manually adjustable means at said stations for selectively changing the response of said means at each of said stations responsive to said control current to effectively connect said transmitting and receiving means to said path at said station during a time interval normally allotted to a called station to establish communication therewith.

LLOYD ESPENSCHIED.

REFERENCES CITED

The following references are of record in the file of this patent:

UNITED STATES PATENTS

| Number | Name | Date |
|---|---|---|
| 1,775,775 | Nyquist | Sept. 16, 1930 |
| 2,004,613 | Meacham | June 11, 1935 |
| 2,245,364 | Riesz | June 10, 1941 |
| 2,263,902 | Percival | Nov. 25, 1941 |
| 2,363,062 | Hartley | Nov. 21, 1944 |
| 2,387,018 | Hartley | Oct. 16, 1945 |
| 2,406,165 | Schroeder | Aug. 20, 1946 |